(12) United States Patent
Hsu

(10) Patent No.: US 6,561,212 B1
(45) Date of Patent: May 13, 2003

(54) PRESSURE INDICATING DEVICE FOR TIRE

(75) Inventor: Mu-Chuan Hsu, Taipei (TW)

(73) Assignee: L&F Plastics Co. Ltd., Taipei (TW)

( * ) Notice: Subject to any disclaimer, the term of this patent is extended or adjusted under 35 U.S.C. 154(b) by 0 days.

(21) Appl. No.: 10/046,475

(22) Filed: Oct. 29, 2001

(51) Int. Cl.⁷ ............................................. F16K 37/00
(52) U.S. Cl. ....................... 137/227; 137/224; 73/146; 73/146.8
(58) Field of Search ............................... 73/146.7, 146.8, 73/146.3, 419, 146.5, 745; 340/58; 137/227, 224, 223, 146.2, 146.8

(56) References Cited

U.S. PATENT DOCUMENTS

| | | | | |
|---|---|---|---|---|
| 3,866,563 A | * | 2/1975 | Bluem | 73/146.8 |
| 3,889,530 A | * | 6/1975 | Bluem | 73/146.8 |
| 4,686,855 A | * | 8/1987 | Smith | 73/146.8 |
| 4,788,525 A | * | 11/1988 | Lichtenstein | 73/146.5 |
| 4,901,747 A | * | 2/1990 | Yabor | 73/146.8 |
| 5,365,967 A | * | 11/1994 | Moore | 73/146.8 |
| 6,293,297 B1 | * | 9/2001 | Maldonado et al. | 73/146.8 |
| 6,351,990 B1 | * | 3/2002 | McInnes | 73/146.8 |

\* cited by examiner

*Primary Examiner*—Max Noori
*Assistant Examiner*—Alandra N. Ellington
(74) *Attorney, Agent, or Firm*—Alan Kamrath; Rider, Bennett, Egan & Arundel, LLP

(57) ABSTRACT

An apparatus mounted on a valve for indicating a pressure of tire comprising a pressure indicator formed of transparent plastic and including a base having a scale, base consisting of an inner hollow cylinder sleeved on valve and an outer hollow cylinder with tops of cylinders open, a spring put on inner hollow cylinder, a seal put on inner hollow cylinder being urged by spring for eliminating a potential air flow through an inner or outer periphery of seal, and a cap having a downward peg engaged with valve, cap being releasably secured to a top of base. In indicating pressure of tire, air is flowed from within tire to push down seal through valve and pressure indicator so that a top of seal is aligned with one of marks of scale. Further, pressure indicator is disengaged from valve prior to inflating tire.

3 Claims, 9 Drawing Sheets

PRESSURE INDICATING DEVICE FOR TIRE

FIELD OF THE INVENTION

The present invention relates to tires of motor vehicle and more particularly to a pressure indicating device for tire of motor vehicle with improved characteristics.

BACKGROUND OF THE INVENTION

A conventional valve 20 of a tube-less tire is projected from rim 10 as illustrated in FIGS. 1 and 2. Valve 20 comprises a hollow cylindrical member 30 through rim 10; a tube member 40 having a lower portion secured within bore of hollow cylindrical member 30 and an upper portion with outer threaded section 402 and an inner threaded section 401; a channel member 50 having a narrow inner hole; a spring 80; a cap 60 having an outer threaded section 601; and an elongate slender bar 70 having a thin disk 701 on lower part with spring 80 anchored between the narrow inner hole of channel member 50 and a top of the elongate slender bar 70. The elongate slender bar 70 is inserted through the channel member 50 and cap 60 until disk 701 is stopped by bottom end of the channel member 50 which is in turn secured in tube member 40. Also, threaded section 601 of cap 60 is secured to the inner threaded section 401 of tube member 40. In inflating tire, air is pumped into tire through bores of cap 60 and channel member 50 by pushing down the elongate slender bar 70 by needle (not shown) for disengaging disk 701 from bottom end of the channel member 50. In the mean time, a person can know the fullness of the tire by observing the pivoting of pointer of a pressure gauge coupled to an air pump. But in a use state of tire, above air passage is closed. Further, person can only knock on the tire by hand or foot for generally determining a fullness thereof by feeling its hardness or hearing its sound prior to driving. However, such technique is not reliable. Thus improvement exists.

SUMMARY OF THE INVENTION

It is therefore an object of the present invention to provide an apparatus mounted on a valve on a tire for indicating a pressure thereof. The apparatus comprises a pressure indicator formed of transparent plastic and including a base having a scale, the base consisting of an inner hollow cylinder sleeved on the valve and an outer hollow cylinder with tops of the cylinders open, a spring put on the inner hollow cylinder having a lower end rested on a bottom of the base, a hollow disk-shaped seal put on the inner hollow cylinder being urged by a top of the biased spring, an outer ring sleeved between the seal and an inner wall of the outer hollow cylinder, an inner ring sleeved between the seal and an outer wall of the inner hollow cylinder so as to eliminate a potential air flow through an inner or outer periphery of the seal, and a cap having a downward peg engaged with the valve, the cap being releasably secured to a top of the base wherein in indicating the pressure of the tire, air is flowed from within the tire to push down the seal through the valve and the pressure indicator so that a top of the seal is aligned with one of marks of the scale, and the pressure indicator is disengaged from the valve prior to inflating the tire.

It is another object of the present invention to provide an apparatus mounted on a first valve on a tire for indicating a pressure thereof. The apparatus comprises a pressure indicator formed of transparent plastic and including a base having a scale, the base consisting of an inner hollow cylinder sleeved on the first valve and an outer hollow cylinder with tops of the cylinders open, a spring put on the inner hollow cylinder having a lower end rested on a bottom of the base, a hollow disk-shaped seal put on the inner hollow cylinder being urged by a top of the biased spring, an outer ring sleeved between the seal and an inner wall of the outer hollow cylinder, an inner ring sleeved between the seal and an outer wall of the inner hollow cylinder so as to eliminate a potential air flow through an inner or outer periphery of the seal, and a cap releasably secured to a top of the base; and a second valve formed on a top of the cap and in communication with the cap, the second valve having an elongate slender bar engaged with the first valve; wherein in indicating the pressure of the tire, air is flowed from within the tire to push down the seal through the first valve and the pressure indicator so that a top of the seal is aligned with one of marks of the scale, and in inflating the tire, air is flowed to the tire through the second valve, the pressure indicator, and the first valve.

It is a further object of the present invention to provide an apparatus mounted on a first valve on a tire for indicating a pressure thereof. The apparatus comprises a pressure indicator formed of transparent plastic and including a base having a scale, the base consisting of an inner hollow cylinder sleeved on the first valve and an outer hollow cylinder with tops of the cylinders open, a spring put on the inner hollow cylinder having a lower end rested on a bottom of the base, a hollow disk-shaped seal put on the inner hollow cylinder being urged by a top of the biased spring, an outer ring sleeved between the seal and an inner wall of the outer hollow cylinder, an inner ring sleeved between the seal and an outer wall of the inner hollow cylinder so as to eliminate a potential air flow through an inner or outer periphery of the seal, and a cap integrally formed on a top of the base; and a second valve formed on a top of the cap and in communication with the cap, the second valve having an elongate slender bar engaged with the first valve; wherein in indicating the pressure of the tire, air is flowed from within the tire to push down the seal through the first valve and the pressure indicator so that a top of the seal is aligned with one of marks of the scale, and in inflating the tire, air is flowed to the tire through the second valve, the pressure indicator, and the first valve.

The above and other objects, features and advantages of the present invention will become apparent from the following detailed description taken with the accompanying drawings.

DETAILED DESCRIPTION OF THE PREFERRED EMBODIMENTS

Figure 1:
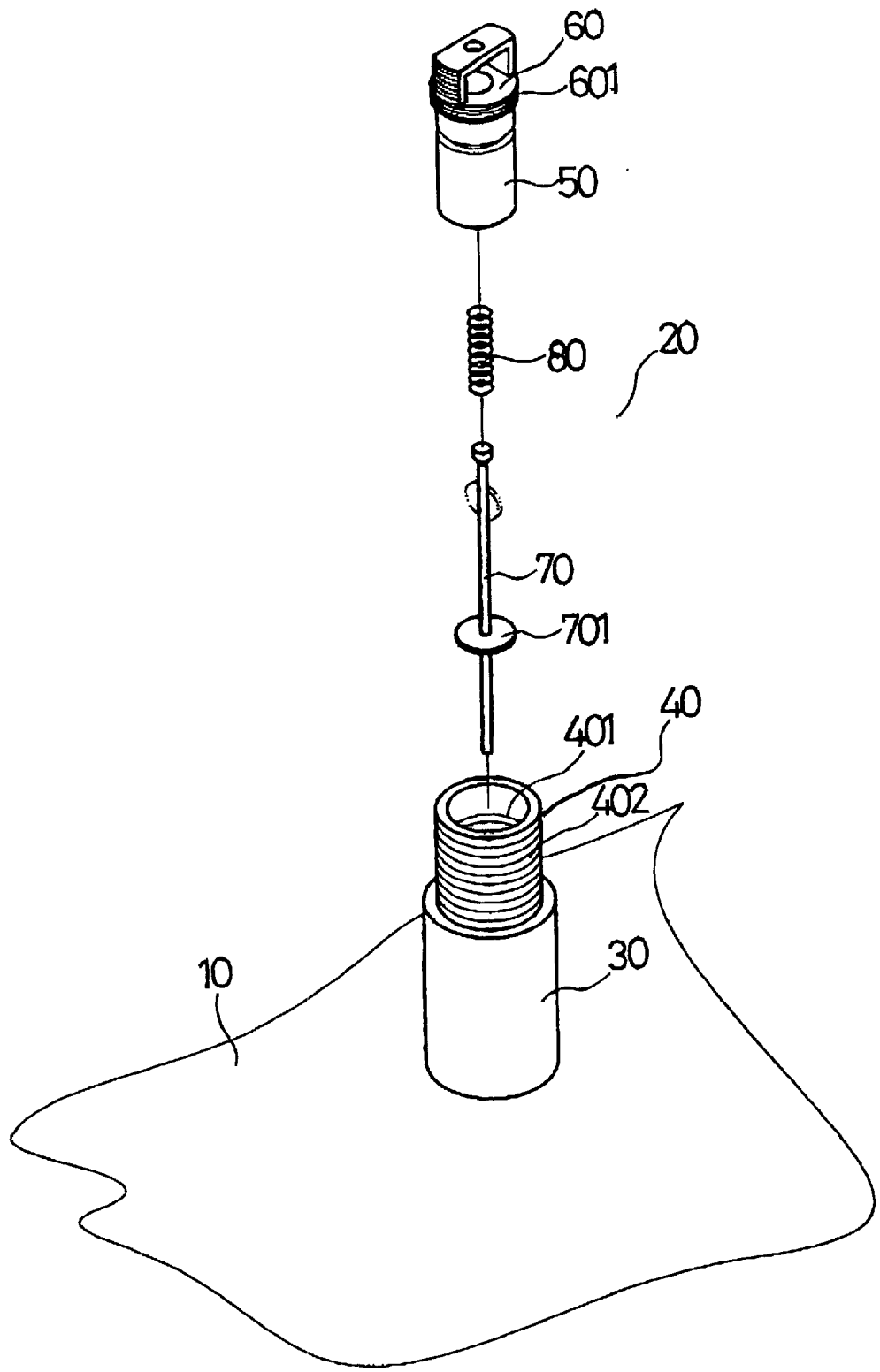
FIG. 1 is an exploded view of valve of tire according to prior art.
Figure 2:
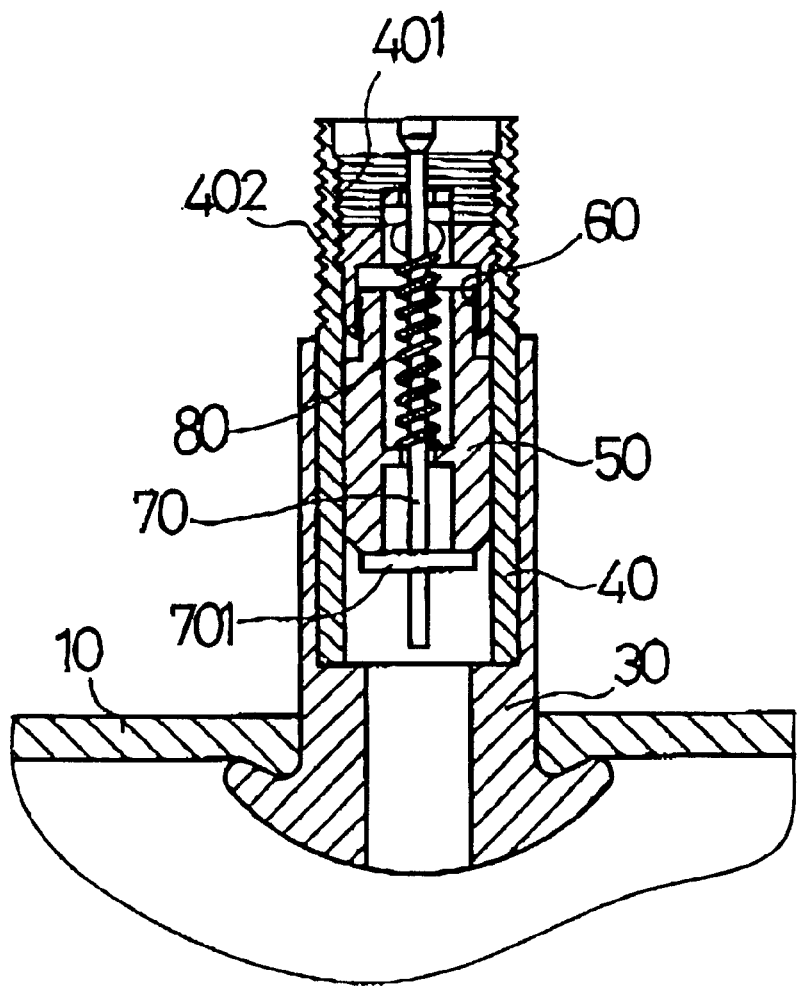
FIG. 2 is a cross-sectional view of the assembled valve of FIG. 1.
Figure 3:
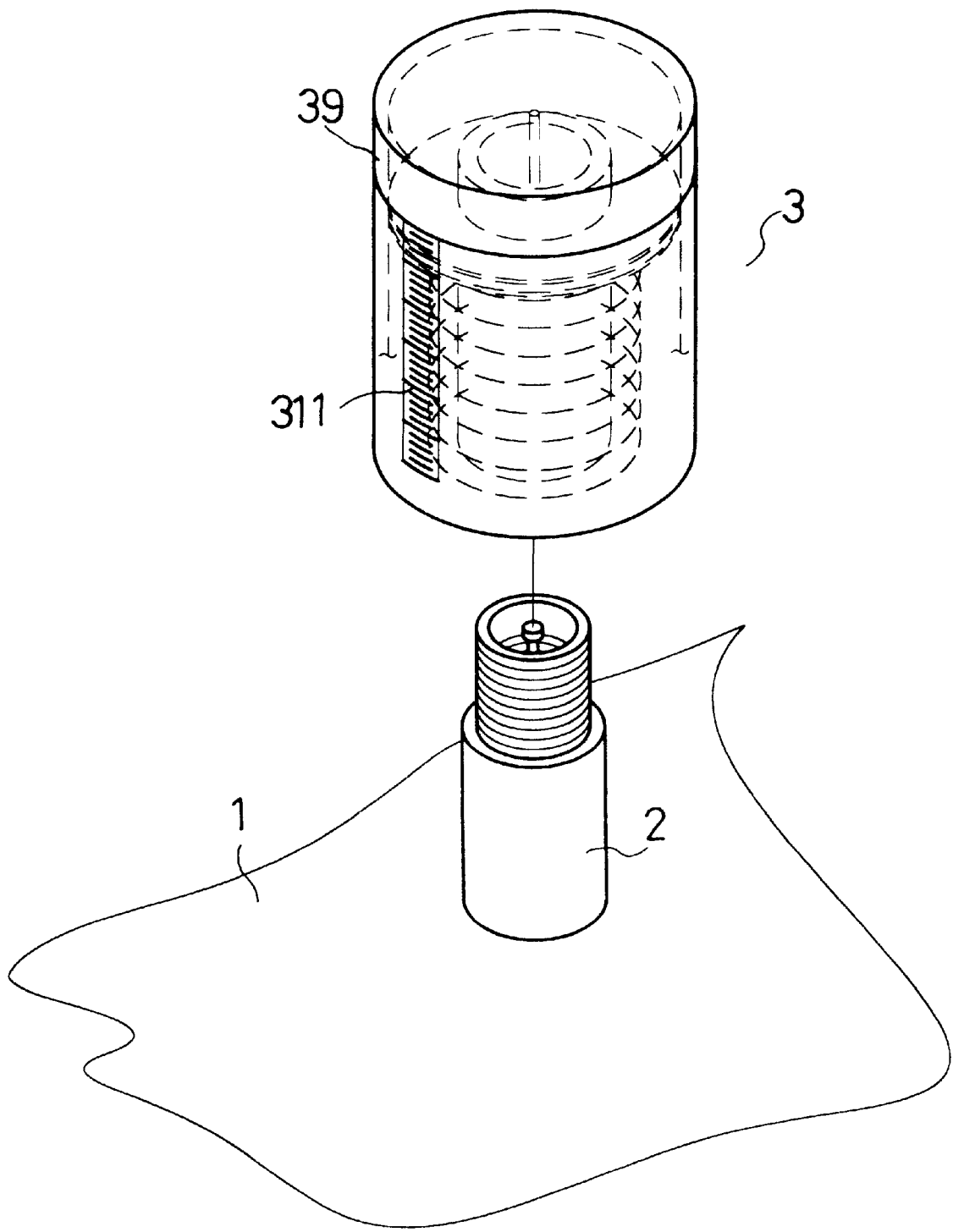
FIG. 3 is a perspective view of a first preferred embodiment of pressure indicating device for tire according to the invention, pressure indicating device being mountable on valve.
Figure 4:
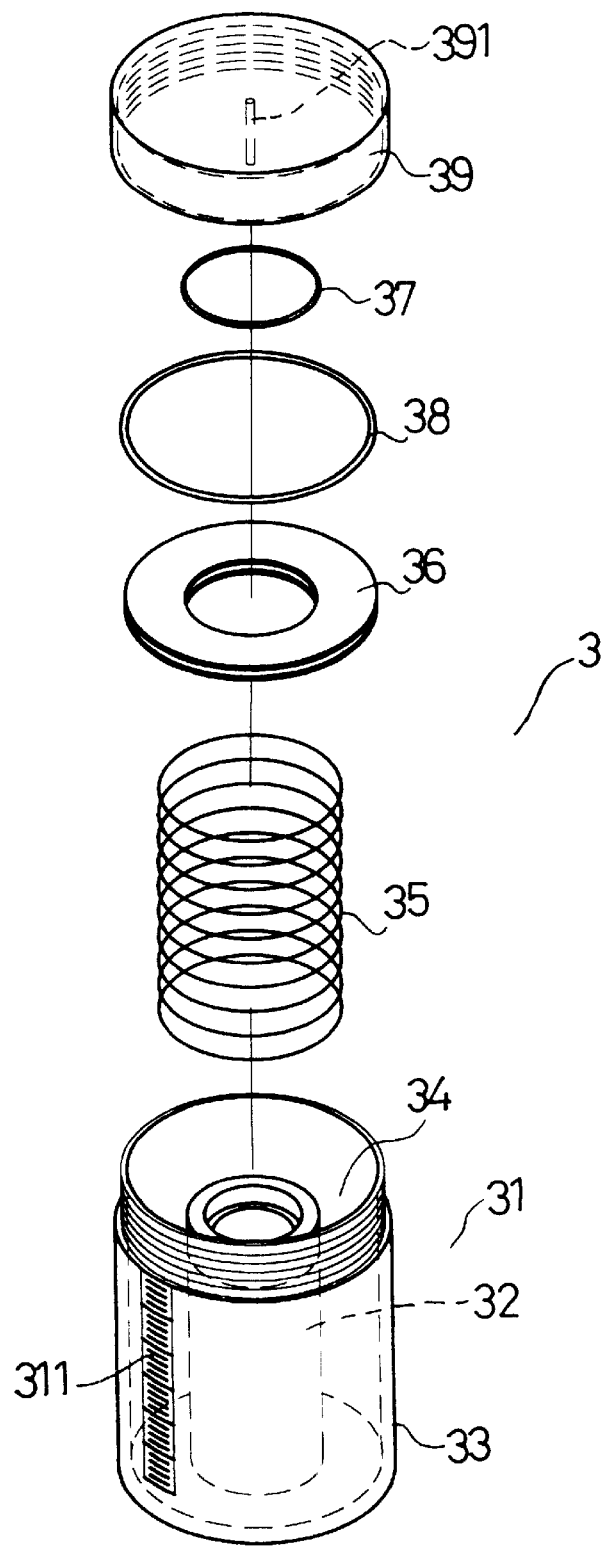
FIG. 4 is an exploded view of FIG. 3 pressure indicating device.
Figure 5:
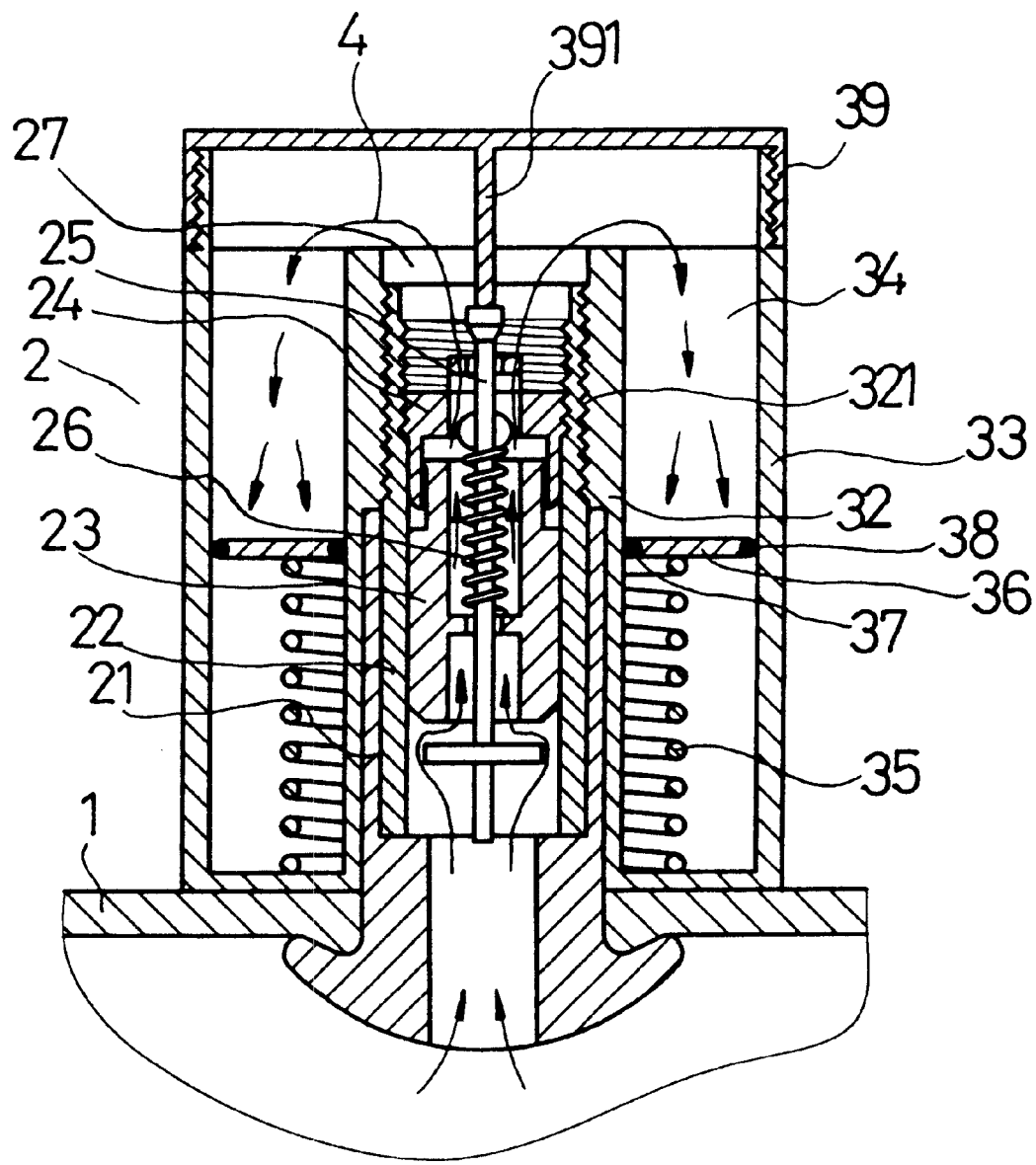
FIG. 5 is a cross-sectional view of assembled pressure indicating device and valve illustrating an air flow for indicating pressure of tire.

Referring to FIGS. 3 to 5, there is shown a first preferred embodiment of pressure indicating device 3 constructed in accordance with the invention mountable on a valve 2 which is projected from rim 1 of tire of an automobile. Valve 2 is a well known device and comprises, as stated above a hollow cylindrical member 21 through rim 10; a tube member 22 having a lower portion secured within bore of hollow cylindrical member 21 and an upper portion with outer threaded section and an inner threaded section; a channel member 23 having a narrow inner hole; a spring 26; a cap 24 having a top recess served as air inlet 27 and an outer threaded section; and an elongate slender bar 25 having a thin disk on lower part with spring 26 anchored between the narrow inner hole of channel member 23 and a top of the elongate slender bar 25. The elongate slender bar 25 is inserted through the channel member 23 and cap 24 until disk is stopped by bottom end of the channel member 23 which is in turn secured in tube member 22. Also, threaded section of cap 24 is secured to the inner threaded section of tube member 22.

As shown in FIGS. 4 and 5, pressure indicating device 3 is formed of hard, transparent plastic material. Pressure indicating device 3 comprises a base 31 having a scale 311 on an outer surface, base 31 consisting of an inner hollow cylinder 32 having an inner threaded section being secured to outer threaded section of valve 2 and an outer hollow cylinder 333 with bottoms of cylinders 32 and 33 coupled together as a closed section and tops thereof open, thus forming a space 34 between cylinders 32 and 33; a helical spring 35 put on inner hollow cylinder 32 having a lower end rested on bottom of base 31 a hollow disk-shaped seal 36 put on inner hollow cylinder 32 being urged by top of the biased spring 35; an outer ring 38 sleeved between seal 36 and inner wall of outer hollow cylinder 33; an inner ring 37 sleeved between seal 36 and outer wall of inner hollow cylinder 32 so as to eliminate a potential air flow through inner or outer periphery of seal 36; and a cap 39 having a downward peg 391 engaged with the air inlet 27, cap 39 being threadedly secured to top of base 31. In a case that for example, driver wants to know the pressure of tire the driver can mount pressure indicating device 3 on valve 2. At this position, air is flowed from tire to push down seal 36 through valve 2 and pressure indicating device 3 as indicated by arrow in FIG. 5. Thus, driver can know the pressure of tire by observing the seal 36 which is aligned with one of marks of the scale 311. To the contrary prior to inflating tire, driver has to disengage pressure indicating device 3 from valve 2.

Figure 6:
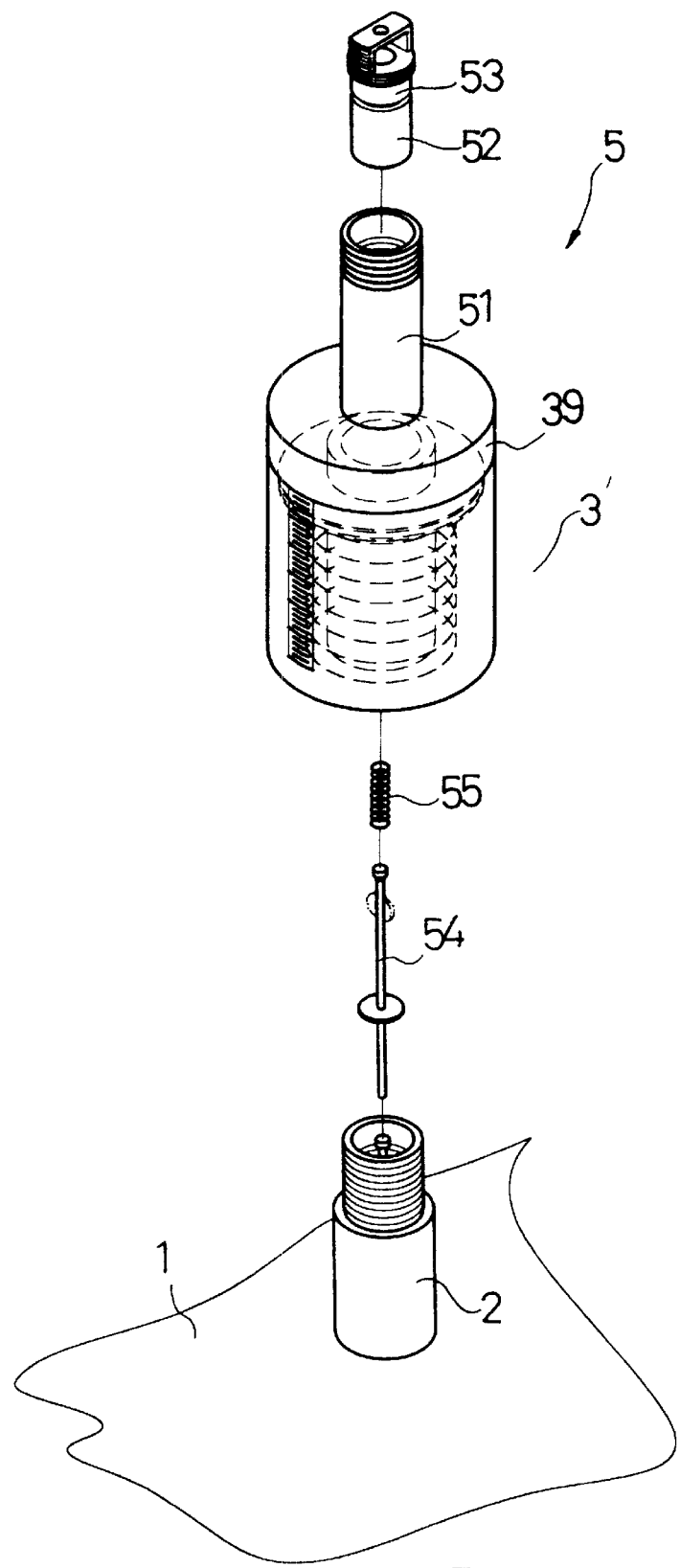
FIG. 6 is an exploded view of a second preferred embodiment of pressure indicating device for tire according to the invention, pressure indicating device being mountable on valve.
Figure 7:
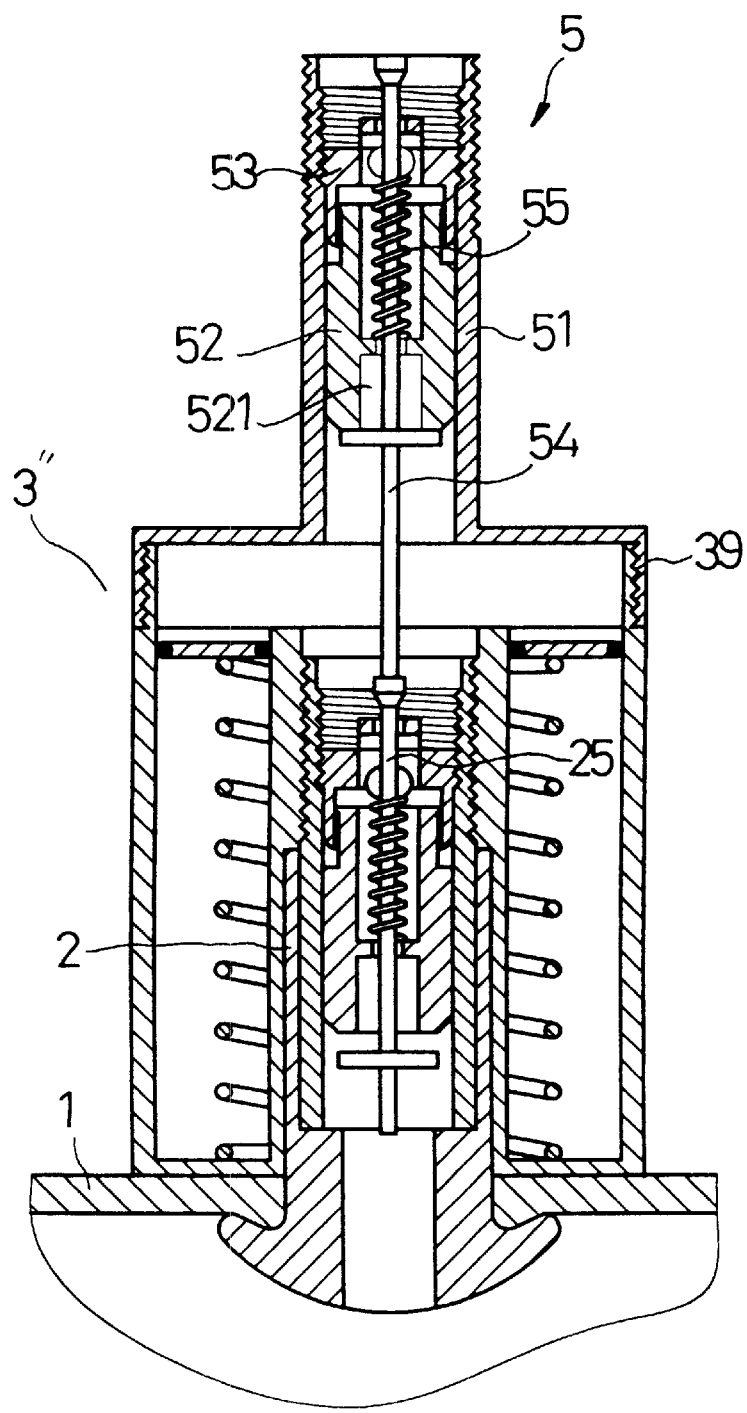
FIG. 7 is a cross-sectional view of assembled pressure indicating device and valve of FIG. 6.
Figure 8:
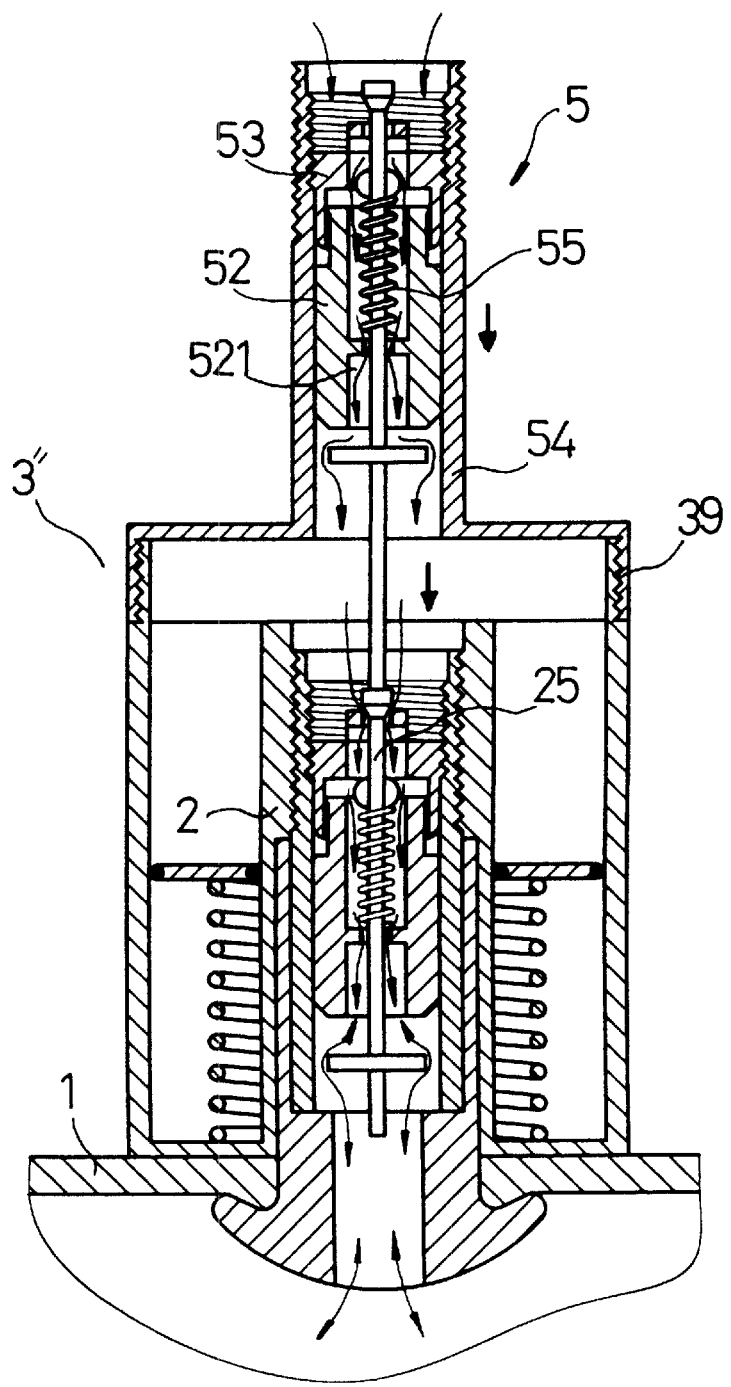
FIG. 8 is a view similar to FIG. 7 where air is being pumped into tire through pressure indicating device and valve of FIG. 6.

Referring to FIGS. 6 to 8, there is shown a second preferred embodiment of pressure indicating device 3' constructed in accordance with the invention. The differences between first and second preferred embodiments are detailed below. A second valve 5 is formed on top of and in communication with pressure indicating device 3'. Similar to valve 20 of prior art, second valve 5 comprises a hollow cylindrical member 51 a channel member 52 having a narrow inner hole; a spring 55; a cap 53 having an outer threaded section; and an elongate slender bar 54 served as peg 391 of first preferred embodiment, the elongate slender bar 54 having a thin disk with spring 55 anchored between the narrow inner hole of channel member 52 and a top of the elongate slender bar 54. The elongate slender bar 54 is inserted through the channel member 52 and cap 53 until disk is stopped by bottom end of the channel member 52 which is in turn secured in hollow cylindrical member 51. Also, threaded section of cap 53 is secured to the inner threaded section of hollow cylindrical member 51. In inflating tire, there is no need to disengage pressure indicating device 3' from valve 2. Also, an air flow while inflating tire is from air pump (not shown) to tire through second valve 5, pressure indicating device 3', and valve 2 as indicated by arrow of FIG. 8.

Figure 9:
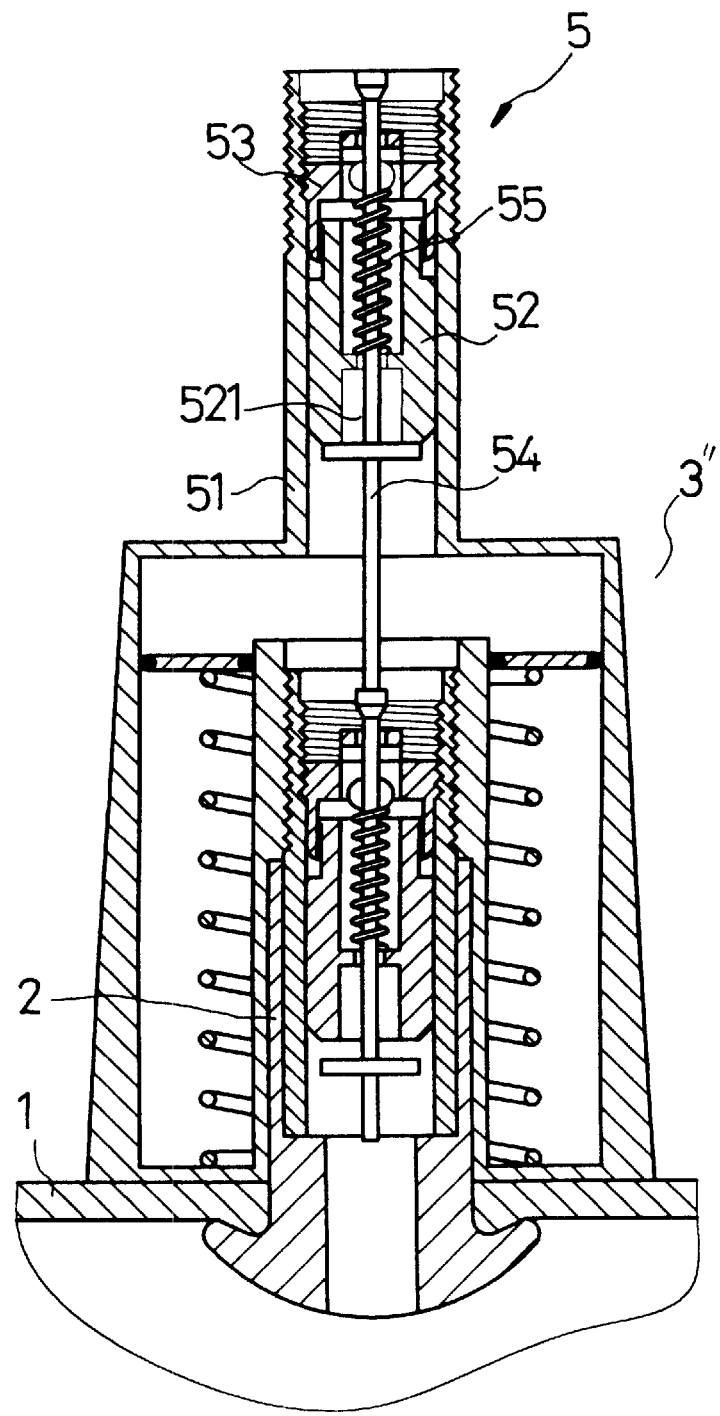
FIG. 9 is a cross-sectional view of a third preferred embodiment of pressure indicating device for tire according to the invention, where pressure indicating device is mounted on valve.

Referring to FIG. 9, there is shown a third preferred embodiment of pressure indicating device 3' constructed in accordance with the invention. The difference between second and third preferred embodiments is that cap 39 of pressure indicating device 3" is integrally formed with base of pressure indicating device 3". This has the benefit of easy assembly.

While the invention has been described by means of specific embodiments, numerous modifications and variations could be made thereto by those skilled in the art without departing from the scope and spirit of the invention set forth in the claims.

What is claimed is:

1. An apparatus mounted on a valve on a tire for indicating pressure thereof, the apparatus comprising a pressure indicator formed of transparent plastic and including a base having a scale, with the base including an inner hollow cylinder having a top and a bottom and sleeved on the valve, with the top of the inner hollow cylinder including an inner threaded section for threadable securement to the valve, with the base including an outer hollow cylinder, with the base including a closed bottom extending between the outer hollow cylinder and the bottom of the inner hollow cylinder, with the base including an open top extending between the outer hollow cylinder and the top of the inner hollow cylinder, with a space being defined between the inner and outer hollow cylinders and the top and bottom of the base; a spring in the space and having a lower end rested on the bottom of the base; a hollow disk-shaped seal in the space and being urged by a top end of the spring; an outer ring sleeved between the seal and an inner wall of the outer hollow cylinder; an inner ring sleeved between the seal and an outer wall of the inner hollow cylinder, with the outer and inner rings eliminating potential air flow past the inner or outer hollow cylinders and the seal; and a cap having a downward peg engaged with the valve, with the cap being releasably secured to the top of the base, with pressure of the tire being indicated when air flows from within the tire to push down the seal toward the bottom of the base through the valve and the pressure indicator so that a top of the seal is aligned with one of a plurality of marks of the scale, and the pressure indicator is disengaged from the valve prior to inflating the tire.

2. An apparatus mounted on a first valve on a tire for indicating pressure thereof, the apparatus comprising:

a pressure indicator formed of transparent plastic and including a base having a scale, with the base including an inner hollow cylinder having a top and a bottom and sleeved on the first valve, with the top of the inner hollow cylinder including an inner threaded section for threadable securement to the valve, with the base including an outer hollow cylinder, with the base including a closed bottom extending between the outer hollow cylinder and the bottom of the inner hollow cylinder, with the base including an open top extending between the outer hollow cylinder and the top of the inner hollow cylinder, with a space being defined between the inner and outer hollow cylinders and the top and bottom of the base; a spring in the space and having a lower end rested on the bottom of the base; a hollow disk-shaped seal in the space and being urged by a top end of the spring; an outer ring sleeved between the seal and an inner wall of the outer hollow cylinder; an inner ring sleeved between the seal and an outer wall of the inner hollow cylinder, with the outer and inner rings eliminating potential air flow past the inner or outer hollow cylinders and the seal; and a cap releasably secured to the top of the base; and a second valve formed on a top of the cap and in communication with the cap, the second valve having an elongate slender bar engaged with the first valve;

with pressure of the tire being indicated when air is flowed from within the tire to push down the seal through the first valve and the pressure indicator so that a top of the seal is aligned with one of a plurality of marks of the scale, and in inflating the tire, air is flowed to the tire through the second valve, the pressure indicator, and the first valve.

3. An apparatus mounted on a first valve on a tire for indicating pressure thereof, the apparatus comprising:

a pressure indicator formed of transparent plastic and including a base having a scale, the base consisting of an inner hollow cylinder having a top and a bottom and sleeved on the first valve, with the top of the inner hollow cylinder including an inner threaded section for threadable securement to the valve, with the base including an outer hollow cylinder, with the base including a closed bottom extending between the outer hollow cylinder and the bottom of the inner hollow cylinder, with the base including an open top extending between the outer hollow cylinder and the top of the inner hollow cylinder, with a space being defined between the inner and outer hollow cylinders and the top and bottom of the base; a spring in the space and having a lower end rested on the bottom of the base; a hollow disk-shaped seal in the space being urged by a top end of the spring; an outer ring sleeved between the seal and an inner wall of the outer hollow cylinder; an inner ring sleeved between the seal and an outer wall of the inner hollow cylinder, with the outer and inner rings eliminating potential air flow past the inner or outer hollow cylinders and the seal; and a cap integrally formed on the top of the base; and a second valve formed on a top of the cap and in communication with the cap, the second valve having an elongate slender bar engaged with the first valve;

with pressure of the tire being indicated when air is flowed from within the tire to push down the seal through the first valve and the pressure indicator so that a top of the seal is aligned with one of a plurality of marks of the scale, and in inflating the tire, air is flowed to the tire trough the second valve, the pressure indicator, and the first valve.

* * * * *